United States Patent
Anthony et al.

(10) Patent No.: US 8,156,007 B1
(45) Date of Patent: *Apr. 10, 2012

(54) DYNAMIC DETERMINATION OF ITEM RETURNS

(75) Inventors: Felix Anthony, Issaquah, WA (US);
Donald Kaufman, Kirkland, WA (US);
Weiling Yang, Sammamish, WA (US);
Jeffrey D. Evarts, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1356 days.

This patent is subject to a terminal disclaimer.

(21) Appl. No.: 10/987,213

(22) Filed: Nov. 12, 2004

(51) Int. Cl.
*G06Q 30/00* (2012.01)
(52) U.S. Cl. ............. 705/26.1; 705/1; 705/22; 705/500
(58) Field of Classification Search ............... 705/1–45, 705/500
See application file for complete search history.

(56) References Cited

U.S. PATENT DOCUMENTS

| | | | |
|---|---|---|---|
| 6,085,172 A | 7/2000 | Junger | 705/28 |
| 6,527,180 B1 | 3/2003 | Dvorkis | 235/462.01 |
| 6,536,659 B1 | 3/2003 | Hauser et al. | |
| 7,287,017 B2 | 10/2007 | Pellinat | 706/59 |
| 2001/0032147 A1* | 10/2001 | Siegel | 705/26 |
| 2001/0047315 A1 | 11/2001 | Siegel | 705/28 |
| 2002/0013744 A1 | 1/2002 | Tsunenari et al. | 705/28 |
| 2002/0046056 A1 | 4/2002 | Demarco et al. | 705/1 |
| 2002/0077914 A1* | 6/2002 | Shatzkin et al. | 705/22 |
| 2002/0120535 A1 | 8/2002 | Yu | 705/29 |
| 2002/0138356 A1 | 9/2002 | Dutta et al. | 705/26 |
| 2002/0178076 A1* | 11/2002 | Ross | 705/26 |
| 2003/0135432 A1 | 7/2003 | McIntyre et al. | 705/28 |
| 2003/0233246 A1 | 12/2003 | Snapp et al. | |
| 2004/0039658 A1* | 2/2004 | Hume et al. | 705/26 |
| 2004/0143518 A1 | 7/2004 | Siegel | 705/28 |
| 2004/0143519 A1 | 7/2004 | Siegel | 705/28 |
| 2004/0181310 A1 | 9/2004 | Stashluk, Jr. et al. | 700/226 |
| 2004/0193436 A1 | 9/2004 | Stashluk, Jr. et al. | 705/1 |
| 2004/0193438 A1 | 9/2004 | Stashluk, Jr. et al. | 705/1 |
| 2004/0194056 A1 | 9/2004 | Combs et al. | 717/104 |
| 2004/0215531 A1 | 10/2004 | Stashluk, Jr. et al. | 705/28 |
| 2005/0114221 A1* | 5/2005 | Walters et al. | 705/26 |
| 2005/0137901 A1* | 6/2005 | Siegel | 705/1 |

OTHER PUBLICATIONS

Amazon.com, Inc., "Problem with an Order?" retrieved Jun. 14, 2004, from http://www.amazon.com/exec/obidos/tg/browse/-/557204/002-4411800-9558405, 2 pages.

(Continued)

*Primary Examiner* — Yogesh C Garg
(74) *Attorney, Agent, or Firm* — Seed IP Law Group

(57) ABSTRACT

Techniques are described for automatically and dynamically determining, at the time that items are being returned from customers, how to handle the returns of the items. A variety of factors may be considered to determine appropriate item return handling for an item, including by assessing current conditions at the time of the item return. In addition, the dynamic item return handling may include selecting one of a variety of potential return locations for each item being returned and one of a variety of types of return routing for the return. After the item return handling is dynamically determined, information may be provided to the customer to facilitate the item return in the determined manner. This abstract is provided to comply with rules requiring an abstract, and with the intention that it will not be used to interpret or limit the scope or meaning of the claims.

55 Claims, 12 Drawing Sheets

OTHER PUBLICATIONS

Amazon.com, Inc., "Need to Return an Item?" retrieved Jun. 14, 2004, from http://www.amazon.com/exec/obidos/tg/browse/-/901888/ref=hp_hp_ct_3_1/002-4411800-9558405, 2 pages.

Amazon.com, Inc., "Return Shipping Methods," retrieved Jun. 14, 2004, from http://www.amazon.com/exec/obidos/tg/browse/-/3484061/pop-up/002-4411800-9558405, 1 page.

Amazon.com, Inc., "Select Your Shipping Method," retrieved Jun. 14, 2004, from http://www.amazon.com/gp/css/returns/submit-items-to-return.html/002-4411800-9558405, 1 page.

The Return Exchange, Inc., "Return Authorization," retrieved May 18, 2004, from http://www.thereturnexchange.com/products/index.asp, 1 page.

United Parcel Service of America, Inc., "Returns," retrieved May 18, 2004, from http://www.theupsstore.com/products/ret.html, 1 page.

Palo Alto Software, Inc., "Services," retrieved May 18, 2004, from http://www.bplans.com/spv/3219/3.cfm, 8 pages.

U.S. Appl. No. 11/015,288, filed Dec. 17, 2004, Spiegel et al.

U.S. Appl. No. 11/015,290, filed Dec. 14, 2004, Spiegel et al.

Newgistics, Inc., "Newgistics Introduces First Suite of Solutions for End-To-End Intelligent Returns Management$^{SM}$," Oct. 27, 2004, retrieved Nov. 1, 2005, from http://www.newgistics.com/news/pr/press_04.10.27.html, 2 pages.

Newgistics, Inc., "Newgistics Launches SmartLabel® Returns Center," Sep. 20, 2004, retrieved Oct. 19, 2005, from http://www.newgistics.com/news/pr/press_04.09.20.html, 2 pages.

"SmartLabel Features & Benefits," retrieved Nov. 1, 2005, from http://www.newgistics.com/products/SL_benefits.html, 1 page.

"Intelligent Returns Management—How it Works.pdf," retrieved Nov. 1, 2005, from http://www.newgistics.com/solutions/index.php, 2 pages.

"Mail by Rail," retrieved Nov. 1, 2005, from http://www.postalmuseum.si.edu/exhibits/2c1_railwaymail.html, 2 pages.

"Inside the Railway Mail Car" retrieved Nov. 1, 2005, from http://www.postalmuseum.si.edu/exhibits/2c1a_insiderms.html, 2 pages.

"Highway Post Office Buses," retrieved Nov. 1, 2005, from http://www.postalmuseum.si.edu/exhibits/2cle_hypobus.html, 2 pages.

* cited by examiner

Web Merchant MMM — 100b

Customer CCC>Returns Center>Select Your Shipping Method  } 105b

Select return shipping method and then click continue at the bottom of the page.} 110b

Select Your Shipping Method

Items
- item B — 140

Shipping Method for these Item(s):
(Learn more)

⊙ U.S. Postal Service: Take package to your local post office. 🖨 Printer required.

○ UPS Drop-off: Drop off package at authorized UPS shipper. 🖨 Printer required.

○ UPS pickup: Have package picked up from the address to which it was originally shipped for a $5.00 charge.

○ Any carrier: Take package to post office or other mailing service.

Web Merchant MMM /—100c

Customer CCC>Returns Center>USPS Return Mailing Label

Important Message

Because your return is not the result of our error, shipping costs associated with your return will be deducted from the amount of your refund. }110c Please print this page, then (Continue ▷)
 cut out the label along the.....lines }151 /—150

```
FROM: _____        NO POSTAGE
       _____        NECESSARY IF
       _____        MAILED IN THE
                                   UNITED STATES
POSTAGE DUE COMPUTED BY DELIVERY UNIT
              POSTAGE        $_____
    MERCHANDISE RETURN FEE   $_____
  TOTAL POSTAGE AND FEES DUE $_____
```

| MERCHANDISE RETURN LABEL | |
|---|---|
| 150b — Permit No. 1111 | 12345 Any Street |
| 150c — Web Merchant MMM | Town1, State1, Country1 |

— 150a

POSTAGE DUE UNIT
US POSTAL SERVICE    } 153
PO BOX 9998
Town1, State1, Country1

FOR WEB MERCHANT MMM USE ONLY: /—160a
eerg17113 /—160b
 /—160c
160

*FIG. 1C*

Web Merchant MMM – Return Processing Instructions

ORDER #1245    RMA: 1111111111
ITEMS: item B

Return to:   Web Merchant MMM – Returns
             12345 Any Street
             Anytown, USA 1. Print the Return Mailing Label page.
2. Cut out the Merchandise Return Label.
3. Write your return address in the space provided in the upper-left corner of the label, after the word "FROM."
4. Securely pack the items to be returned in a box and, if possible, include the original packing slip in the package.
5. Affix the Merchandise Return Label securely to the package.
6. Take the package to your nearest post office for delivery. No postage is necessary if the package is mailed from the United States.

Please note: Your refund will be processed in 7 to 14 business days once your return has been received. Shortly after it has been processed, you will receive an e-mail regarding your refund.

Web Merchant MMM /—100e

Customer CCC>Returns Center>USPS Return Mailing Label

Important Message
Because your return is the result of our error, shipping costs associated with your return will be refunded to you. }110e Please print this page, then (Continue ▷)

 cut out the label along the.....lines /—150

---

FROM: _____
_____
_____

POSTAGE DUE COMPUTED BY DELIVERY UNIT
POSTAGE $ _____
MERCHANDISE RETURN FEE $ _____
TOTAL POSTAGE AND FEES DUE $ _____

NO POSTAGE NECESSARY IF MAILED IN THE UNITED STATES

MERCHANDISE RETURN LABEL
Permit No. 1111    12345 Any Street
Web Merchant MMM   Town1, State1, Country1

POSTAGE DUE UNIT
US POSTAL SERVICE
PO BOX 9998
Town1, State1, Country1

FOR WEB MERCHANT MMM USE ONLY:

eerg17113

*FIG. 1E*

Web Merchant MMM

Customer CCC>Returns Center>USPS Return Mailing Label

Important Message
Because your return is the result of our error, shipping costs associated with your return will be refunded to you.

Please print this page, then (Continue ▷)

✂ cut out the label along the.....lines, and place on package } 171

Shipment: eerg17112

FROM: _____

POSTAGE DUE COMPUTED BY DELIVERY UNIT
    POSTAGE $_____
    MERCHANDISE RETURN FEE $_____
    TOTAL POSTAGE AND FEES DUE $_____

NO POSTAGE NECESSARY IF MAILED IN THE UNITED STATES

} 170

✂ cut out the label along the lines, and enclose in package } 176

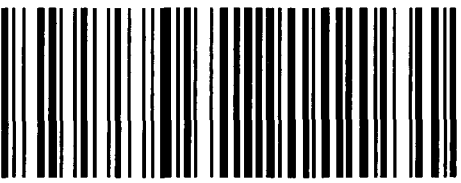

FOR WEB MERCHANT MMM USE ONLY:
RMA: 1111111111

Item B: Product was mistakenly shipped to me

DYNAMIC DETERMINATION OF ITEM RETURNS

TECHNICAL FIELD

The following disclosure relates generally to handling the return of merchandise, and more particularly to dynamically determining how and where items are to be returned, for example, in view of current conditions at the time of return.

BACKGROUND

The World Wide Web ("the Web") allows users of Web browser applications to retrieve information (e.g., Web pages) from Web servers and display that information. The Web has also increasingly become a medium used to shop for items, such as products or services for purchase, rent, lease, license, trade, evaluation, sampling, etc. Indeed, a vast number of different items may be ordered or obtained on the Web. In many circumstances, a user who plans to purchase an item on the Web can visit the Web site of a Web merchant that sells the item, view information about the item, give an instruction to purchase the item, and provide information needed to complete the purchase, such as payment and shipping information.

After receiving an order for one or more items, a Web merchant fulfills that order by determining how and when to provide the items to the customer. The order fulfillment process typically used by Web merchants shares some similarities with other item ordering services (e.g., catalog-based shopping, such as from mail-order companies) in which ordered items are shipped, such as from a centralized distribution center that maintains the ordered item in inventory.

Although Web-based and catalog-based shopping can provide various advantages, such transactions can also have certain disadvantages. For example, some such disadvantages involve difficulties to customers and merchants in the conventional handling of the return of unwanted items. Such item returns can occur for a variety of reasons, including customers having purchased the wrong item, delivered items that are defective, an error in the order fulfillment process that resulted in the wrong item being provided or an item being provided to the wrong recipient, and the customer merely changing their mind. While there are many reasons that may lead to a customer's decision to return an item, a customer nonetheless typically desires to easily transfer possession of the item to the merchant and quickly receive any applicable refund or credit. Conversely, a merchant typically desires to minimize the cost of processing the return, maximize customer satisfaction regarding the returns process (e.g., by minimizing the activities required of the customer), quickly dispose of the returned items in the most economically advantageous manner, and protect itself from unscrupulous customers who attempt to improperly obtain refunds (e.g., for items that have been damaged or switched after delivery).

In a traditional brick-and-mortar retail store, customers conduct business in person, and returns are usually processed at the store. Such stores generally have the personnel and facilities to verify the condition and identity of the returned items, take possession of the items, and process any refund. Furthermore, such retail stores customarily have the infrastructure to resell items that are in good condition or to return items to a manufacturer or distributor as appropriate.

Web merchants have conventionally used a returns processing approach similar to that of brick-and-mortar retailers, such as by designating in advance one or more of their distribution centers or other specialized return centers (e.g., centers geographically distributed throughout the areas in which customers typically reside) to which customers ship all returned items. In many cases, a customer who would like to return an item first contacts the Web merchant to obtain a Return Merchandise Authorization (RMA) number for the item, such as via phone or the Web site of the merchant, which allows the Web merchant to estimate a volume of returned items that is expected and to later track shipped packages with returned items based on RMA numbers included with the packages. After receiving and verifying the returned items, the merchant typically issues a refund or credit to the customer as appropriate.

In other situations, a Web merchant may designate in advance one or more third-party return locations to which all items being returned will be shipped, such as a return processing location of a third-party service provider who performs specified types of processing on the items. For example, some such third-party service providers may perform activities to verify received items before forwarding the items back to the merchant, or in other situations may dispose of the returned items in manners other than returning them to the merchant (e.g., by storing the items until they are distributed to another destination). In other situations, a pre-designated third-party return location may merely be an off-site location that receives shipped packages having returned items so that the merchant can retrieve their packages from that location, such as by using Parcel Return Services of the regional Bulk Mail Centers (BMCs) of the United States Postal Service (USPS).

Unfortunately, these conventional returns processing approaches create various problems for Web merchants. For example, when a customer is not geographically near a pre-designated return location, the shipping of the items being returned may be expensive and may take an unduly long time to occur, resulting in a longer time before the customer receives their refund and before the Web merchant is able to resell the item. Furthermore, delays in return processing can create particular financial difficulties for merchants if the items being returned depreciate in value rapidly. In addition, for merchants that sell a wide variety of merchandise, some types of items may require specialized return processing (e.g., items of high value and/or of technical complexity, such as jewelry or electronics) that is costly to replicate at multiple locations, and thus items of that type that are being returned may ultimately need to be sent to a single remote location that performs the specialized return processing.

In light of these problems with conventional methods for processing returned items, it would be beneficial to have a more effective approach to return processing.

BRIEF DESCRIPTION OF THE DRAWINGS

FIGS. 1A-1F are example user interface screens that may be provided to users of a Web-based item ordering service in order to assist in dynamically determining appropriate handling of item returns based at least in part on current conditions.

DETAILED DESCRIPTION

A software system is described below that, for items being returned, assists in automatically and dynamically determining at the time of the return of each of the items how to handle that item's return. In some embodiments, the items are returned from customers of merchants, with the item return handling determination performed on behalf of the one or more merchants that originally supplied the items to the customers, such as in a manner based on the business needs of the merchants and on current conditions at the time of the returns. In addition, in some embodiments a variety of potential return locations are available for items, and the dynamic determination of how to handle the return of each of the items includes selecting one of the potential return locations for the item. Moreover, in some embodiments the dynamic determination of how to handle an item return further includes selecting a particular manner of performing the return, such as based on multiple potential alternatives for performing the return. After an appropriate manner of handling an item return is dynamically determined, the system may in some embodiments further assist in the return processing for the item, such as by providing information to a customer who is returning the item to facilitate the return of the item to a dynamically determined return location and/or in a dynamically determined manner for performing the return.

Figure 1A:
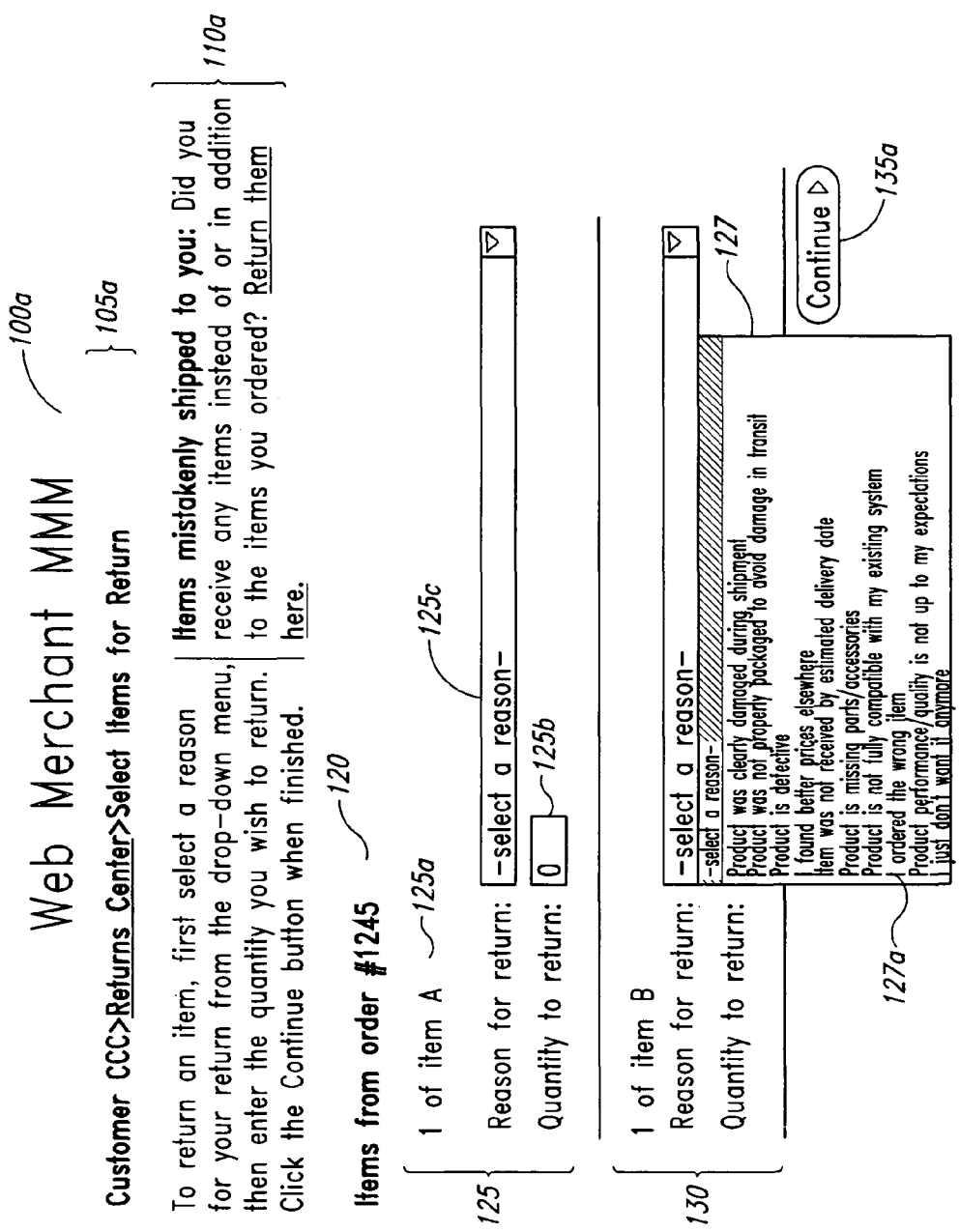
Figure 1G:
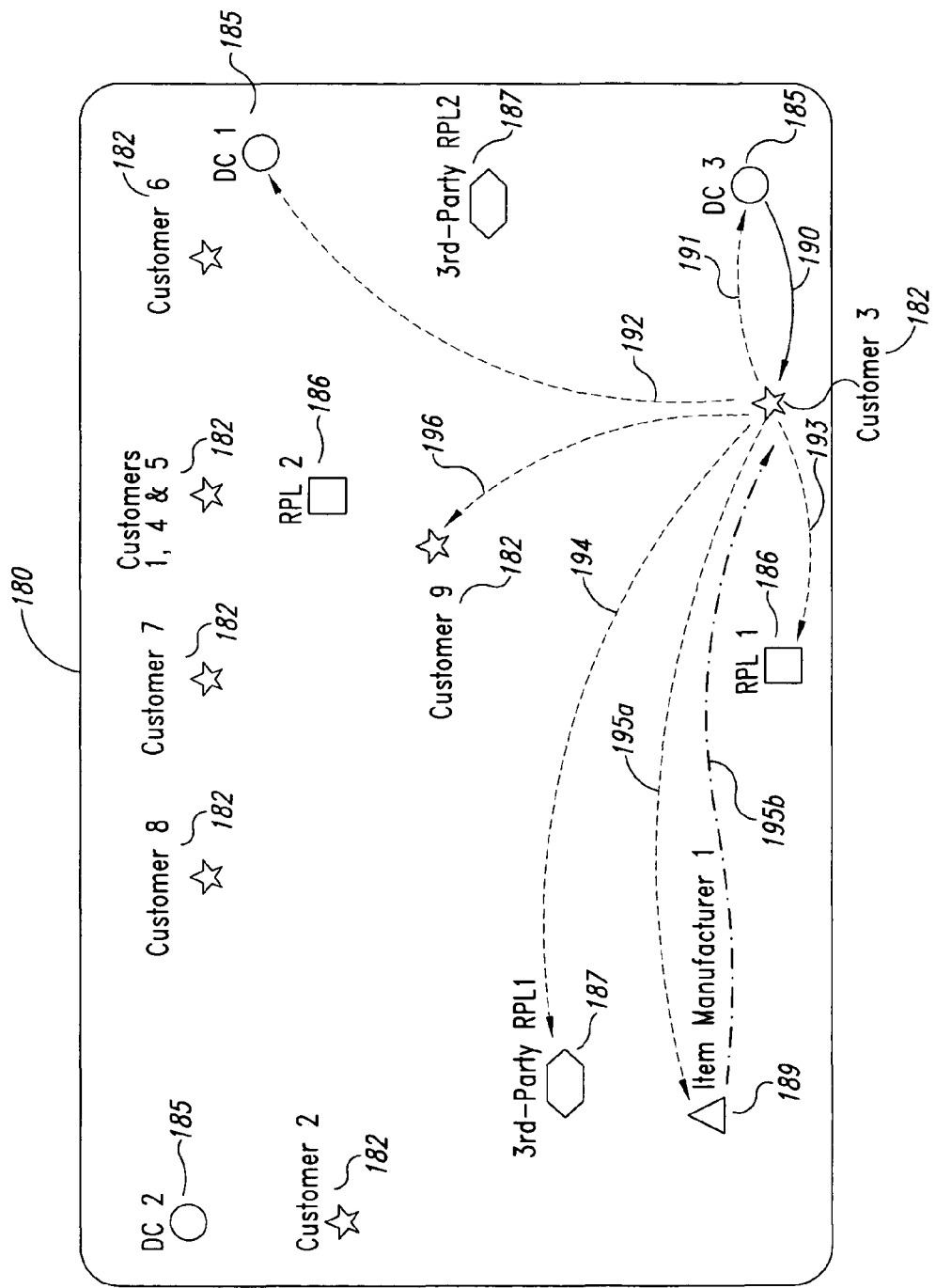
FIG. 1G illustrates examples of dynamically determining an appropriate return processing location for an item based on a variety of factors and on current conditions at the time of the return.

FIG. 1G illustrates various examples of dynamically determining appropriate return locations for an item based on a variety of factors and on current conditions at the time of the return. In particular, in the illustrated example a variety of customers 182 of a merchant are distributed at various locations within a geographical area 180, and the merchant has several item distribution centers ("DCs") 185 that are also distributed at various geographical locations. When a customer of the merchant orders an item from the customer, the merchant selects one of the DCs to fulfill the order by providing the ordered item to the customer—the selection of a DC for an item order can be made in various ways and based upon various factors, including geographical distance between the DC and the customer. In this example, the DC 3 distribution center of the merchant has previously supplied 190 one or more items to the Customer 3, and Customer 3 would now like to return at least one of those items to the merchant, such as for refund or other compensation, exchange or repair.

After Customer 3 notifies the merchant that the customer desires to return one of the items, the merchant dynamically determines an appropriate return location for the item and arranges for that return. For example, the customer may interact with a graphical user interface of a Web site (not shown) of the merchant to provide information about the item return, and may receive a real-time response from the merchant via the Web site that provides information about the dynamically selected return location, such as a mailing label to be printed by the customer and used with a package containing the item in order to direct the package to the selected return location. While not illustrated in this example, the merchant may also in some embodiments dynamically determine an appropriate manner for performing the item return and arrange for the item return to be performed in that manner, such as to select a manner or type of routing the item to a return location by using a particular shipping carrier (e.g., the United States Postal Service, a specified private shipping company, etc.), by using a particular transportation speed (e.g., next-day air, ground shipping, etc.) and/or transportation mode (e.g., by truck, train, air, cargo ship, etc.), by using a particular shipping method (e.g., with specified options for tracking the item shipment and/or verifying delivery, by specifying a selected amount of transportation insurance, by specifying how and from whom payment for the shipping will be provided, etc.), by using a particular transportation path or other route, etc. Furthermore, while also not illustrated in this example, the merchant may in some embodiments allow the customer to participate in the dynamic determining of the return location and/or routing for the item return (e.g., for a fee, as a perquisite for preferred customers, etc.), such as by presenting options to the customer and allowing them to select or otherwise specify preferences via a graphical user interface of a Web site (not shown) of the merchant.

A variety of types of return locations are illustrated in FIG. 1G, although in some embodiments only some of the illustrated types of return locations may be used and/or other types of return locations or other destinations that are not illustrated here may be used. In this example, potential return locations for the item include the multiple DCs of the merchant, multiple return processing locations ("RPLs") 186 of the merchant that process item returns but are not DCs (e.g., to provide various types of specialized return processing), multiple RPLs 187 of third-parties that process item returns for the merchant (e.g., based on a predefined business relationship), a location 189 of the item manufacturer or other party involved in the initial supply of the item to the merchant (e.g., a distributor or other intermediary), and other customers of the merchant.

Thus, as one example, the item being returned may be sent 191 back to the DC 3 distribution center, such as to allow the item to be re-distributed to another customer to fulfill an order from that other customer if the item is in an appropriate condition (e.g., not defective and still in new condition). The DC 3 distribution center may be selected in this example over other DCs for various reasons, such as based on DC 3 being the nearest DC to the customer and/or being the DC from which the item was previously distributed to the customer.

Alternatively, another DC may be dynamically selected for the item return, such as to instead send 192 the item to distribution center DC 1 based on current conditions, such as DC 1 having a current need for the item (e.g., based on a low inventory level relative to current or projected demand for the item) and/or based on an inability of other distribution centers (e.g., DC 3) to effectively handle the item return (e.g., based on a current lack of storage space or labor capacity to handle the item return processing). Alternatively, other types of conditions could make DC 1a more attractive return location for the merchant than DC 3 for the item at the current time, such as temporary conditions that make an item return to DC 3 difficult (e.g., bad weather or a natural disaster near DC 3, bad traffic near DC 3, a workers' strike at DC 3 or along the route from Customer 3 to DC 3, etc.). Other factors can similarly influence a return location that is selected, such as legal or cost restraints related to transporting at least some types of items between certain locations (e.g., duties and/or other taxes related to moving items to and/or from a country or state, laws regulating movement of items between countries or between states, etc.) and/or manners of transporting certain categories of items (e.g., hazardous materials or firearms).

More generally, a particular potential return location may be dynamically selected as an appropriate or optimal choice for the item return based on receiving the highest evaluation among multiple potential return locations for one or more criteria of interest, such as lowest total cost to the merchant for the return. Such cost considerations may include not only direct costs to the merchant (e.g., costs for shipping the item to a return location and labor costs for processing the item return), but also a variety of other types of costs related to customer goodwill and to subsequent actions taken in regard to the item after the return processing. For example, minimizing total costs for the item return given the current conditions may include returning the item as quickly as possible, such as based on the item being of particularly high value, the item being perishable or otherwise likely to depreciate in value during a lengthy return process, the customer being of particularly high value to the merchant and/or particularly eager to receive a refund after the item has been returned, the customer being willing to pay extra for a rapid and/or convenient item return process, etc.—if so, DC 1 may be selected over DC 3 based on being able to process the item return more quickly (e.g., based on an ability to transport the item more rapidly to DC 1 than DC 3 and/or an ability of DC 1 to process the item return more rapidly).

In other situations, return locations of types other than DCs may be dynamically selected for the item being returned based on a variety of types of factors. For example, a merchant or third-party RPL may be selected for an item based on having special return processing capabilities, such as capabilities to verify the condition of the item being returned (e.g., to verify authenticity of jewelry items, such as when fraud is suspected or instead for all jewelry item returns), or capabilities to provide repair/refurbishment activities for items that are defective or whose condition is not sufficiently new. In other situations, an RPL may instead merely provide standard item return handling capabilities, such as to receive items being returned and forward them to appropriate destinations as instructed (e.g., to forward defective items to repair locations and to forward non-defective items to an appropriate distribution center.) Thus, FIG. 1G also illustrates examples of Customer 3 sending 193 the item to a merchant return processing location RPL 1 or alternatively sending 194 the item to a third-party return processing location RPL 1.

In other situations, other types of factors may cause other types of return locations to be selected for an item being returned. For example, if an item provided to a customer is defective, in some situations a manufacturer or other supplier of the item will provide direct vendor replacement services in which the item can be returned directly to the item supplier in order to rapidly receive a replacement or a refund from the supplier. If so, Customer 3 may be directed to send 195a the item to Item Manufacturer 1, and in this example Item Manufacturer 1 then returns 195b a repaired or replacement item to Customer 3. Alternatively, if the current conditions are appropriate, Customer 3 may instead be directed to send 196 the item to another customer, such as Customer 9, in order to fulfill an order from that customer. Appropriate conditions for sending an item directly from a first customer to another customer may include that the item is not defective and is in sufficiently good condition, that original packaging is available for the item (if it was opened), and/or that information about the first customer (e.g., based on prior interactions between the first customer and the merchant) indicates that the first customer is sufficiently trustworthy to allow them to send items to other customers on behalf of the merchant.

While not illustrated here, the return processing for an item may further involve a variety of types of activities after the item is initially sent to the dynamically selected return location. For example, in addition to the types of return processing capabilities previously noted, additional activities may also be performed in regard to an item, such as activities of a DC or RPL to subsequently forward a returned item to another customer, a DC, an RPL, an item supplier location, or other destination. In addition, given that the determination of a return location for Customer 3 is performed in a dynamic manner at the time of the return, it will be appreciated that distinct returns of the same item by Customer 3 at different times (e.g., separated by an hour or a day) may produce different dynamically selected return locations based on changing conditions.

Thus, a variety of types of return locations may be dynamically selected in various embodiments as part of a dynamic process for determining how to handle item returns. Such locations may include one or more distribution centers for the merchant from whom the customer previously received an item being returned, one or more specialized return processing locations for the merchant, one or more third-party return processing locations that receive item returns on behalf of the merchant (e.g., to perform various processing of the items and/or to forward the items to the merchant or elsewhere as specified by the merchant), one or more locations for the manufacturer or other supplier of the item (e.g., for direct vendor returns), one or more other customers (e.g., to forward an item that is not desired by the customer performing the return to another customer that does desire the item), etc. While not illustrated in this example, other types of return locations may also be selected in other situations, such as to send item returns that are suspected to be fraudulent to appropriate law enforcement or investigative personnel for immediate handling and/or to preserve a chain of evidence (e.g., for returns of items from item shipments sent to customers suspected of repeated fraud that were reviewed and/or flagged at the time of original item shipment).

In some embodiments, the dynamic item return handling determination process is initiated by an indication that an item is to be returned from a customer, such as an indication received from the customer. For example, an interactive mechanism (e.g., a Web site) may be provided via which a customer can indicate a desire or intention to return one or more items and can specify additional information related to the returns. A variety of types of additional information may be specified and used in the dynamic determination process in various embodiments, including various reasons for the return of each of the items, information about the current location of the item(s) and/or the customer, information about the condition of the item(s), information about the condition of packaging for use in returning the item(s), customer preferences or instructions related to how and when the return processing will occur (e.g., how the item(s) will be transported to the selected return processing location), etc. As discussed in greater detail below, FIGS. 1A-1F illustrates examples of user interface screens that may be used in some embodiments to perform at least some such interactions with customers. Alternatively, the indication that an item is to be returned can be received in other ways and for other reasons in some embodiments, including from the merchant that supplied the item and/or from other parties (e.g., the item manufacturer or other supplier, a government agency, etc.), and for reasons that are not initiated by the customer (e.g., a recall of the item).

After an indication is received that an item is to be returned from a customer and any additional related information is obtained, that information can be assessed along with current information about a variety of types of factors in order to dynamically determine how the item return handling is to occur, including dynamically selecting an appropriate return location and/or dynamically selecting an appropriate manner of routing an item to a return location. Information about current values for various factors based on current conditions can be gathered and used in the dynamic item return handling determination process in various ways, as discussed in greater detail below.

In particular, in some embodiments some factors may trigger specialized handling for an item return if they apply, while in other embodiments a variety of factors may be considered in combination when determining appropriate item return handling. For example, specialized item return handling factors may include whether the item is being recalled, whether fraud is suspected as part of the return of the item (e.g., based on information about prior activities of the customer and/or information provided by the customer when indicating the desire to return the item), whether the item is one for which another party provides specialized return processing (e.g., direct vendor replacement from an item manufacturer or distributor), whether the item is of one or more predefined types or categories for which specialized processing is performed, etc. If one of the specialized handling factors does apply for an item being returned, corresponding predefined processing for that factor may be dynamically selected for the item return handling, such as by returning the item to a predetermined return location corresponding to that factor (e.g., a return location with specialized handling capabilities for a type of item, such as to inspect jewelry items being returned), by routing or otherwise performing the item return to a return location in a predetermined manner, and/or by performing additional predefined activities related to the item (e.g., performing additional review of items for which fraud is suspected). Moreover, if multiple specialized handling factors apply for an item return, the item return handling may include processing corresponding to several or all of the applicable factors in some embodiments, while in other embodiments a single one of those applicable factors (e.g., the factor with the highest priority) may be used to determine the appropriate item return handling (e.g., by using a decreasing order of priority based first on item recalls, next on suspected fraud, next on processing for predefined item types or categories, etc.).

In embodiments in which specialized item return handling factors are not used or in situations in which no specialized item return handling factors apply to an item being returned, a combination of various factors may potentially be considered when determining an appropriate return location or destination and/or when determining an appropriate manner of routing the item to a return location or otherwise performing the item return. Such factors may generally include information about the customer, information about the item, information about capabilities and current status of various potential return locations regarding processing the return of the item, information about current capabilities and status regarding transporting the item to the potential return locations, and information about capabilities and current status of the potential return locations or other related locations regarding final disposition of the item after the initial return processing is complete.

For example, factors relevant to potential return locations may include factors that reflect a need for the item (e.g., inventory levels at a distribution center that are low relative to current or projected demand), factors that reflect an expressed desire to receive the item (e.g., an order from another customer for the item, or an indication from a return processing location that it has excess capacity), and factors that reflect an ability to handle the processing of the return of the item and/or the final disposition of the item after the return processing (e.g., capabilities of a return location in handling some or all items and/or some or all types of processing, current and projected labor capacity, current and projected storage capacity, etc.). Factors relevant to transportation of an item to a return location include factors that affect the time and cost of moving the item to the return location (e.g., distance between the item location and the return location, types of transport mechanisms between the two locations, types of return-related services to be provided by a carrier performing the transportation and/or other third party, etc.), factors relevant to legal restrictions regarding the movement (e.g., legal restrictions or additional costs associated with various types of item movements, such as across country or state boundaries, and/or legal restrictions or additional costs associated with items of specific types, such as hazardous materials or firearms), and factors that reflect an amount or type of effort needed by the customer as part of the item return (e.g., pickup from the customer location, deposit by the customer at a nearby location, etc.). Factors relevant to an item include a location of the item, attributes of the item that affect the ability to transport the item (e.g., weight, any special handling requirements, etc.), items of types or categories that require special handling, a value of the item, any projected depreciation or other change in value of the item during the item return handling, a current status and condition of the item (e.g., defective, operable but in slightly used condition, etc.), information about the packaging for the item, etc. Factors relevant to customers include a location of the customer, a sensitivity of the customer to activities that they need to perform to return an item and/or to delays in receiving refunds for item returns, instructions received from the customer related to how the item return handling is to occur, a current and/or projected future value of the customer to the merchant (e.g., based on projected future sales to the customer and/or other benefits related to the customer, such as expected referrals from the customer or willingness of the customer to provide feedback or other information of use to the merchant), other information available about the customer (e.g., a status of the customer as being a preferred customer; a status of the customer as being suspected of engaging in fraudulent item returns or other transactions; a reputation of the customer with the merchant or from a third-party system, such as based on prior activities of the customer and/or evaluations of the customer by other users; etc.), any contractual restrictions or other agreements with the customer concerning item returns, etc.

The combining of the various factors to dynamically determine an appropriate return location and/or other dynamic handling for an item return can be performed in various ways in various embodiments. In some embodiments, each of multiple potential return locations for an item is treated as a distinct option for the item return and is evaluated relative to the other potential return locations based on the various applicable factors. In other embodiments, some or all of the potential return locations may instead each have multiple associated return options, with each of the options including a unique combination of a return location or other destination and of a manner of routing the item to the return destination. More generally, in some embodiments the system may consider a variety of factors with respect to each of the options being considered, including different manners of performing final disposition of the item from the return location after the return processing has been performed.

When combining multiple factors in order to evaluate a dynamic return option relative to other dynamic return options, a relative effect or influence of each of the factors on the evaluation can be specified in various ways. In some embodiments, each factor has an associated weight (or multiple weights that each correspond to a group of items, such as items of a specified type or category), and the weights for the factors are used to calculate a weighted score for each of the dynamic return options based on current values of the factors for those options. Such weights can take a variety of forms in different embodiments, including numeric, boolean and/or enumerated values. Using such weighted scores, the dynamic return options can be ranked (e.g., based on highest or lowest weighted score), and one or more of the most appropriate or desirable options based on rank can be dynamically selected for use with an item return. In other embodiments, information about how various of the factors contribute to one or more higher-level criteria may further be specified, and that higher-level criteria may then be used to evaluate the various dynamic return options. For example, a merchant may desire to minimize the overall costs of performing the return processing, and the contribution of the various factors to various costs for a dynamic return option may be specified, such as the costs of transporting an item to a return location for the option in a specified manner, the costs of performing the return processing at the return location, the costs of performing final disposition processing for the item after the return processing is completed, and modeled customer goodwill costs. Additional details related to using various factors and criteria in making decisions related to item handling are included in co-pending U.S. patent application Ser. No. 09/965,125, filed Sep. 27, 2001 and entitled "Generating Current Order Fulfillment Plans Based On Expected Future Orders," and in co-pending U.S. patent application Ser. No. 10/916,772, filed Aug. 11, 2004 and entitled "Dynamically Classifying Items For International Delivery," both of which are hereby incorporated by reference in their entirety. This application is also related to U.S. patent application Ser. No. 10/987,214, filed concurrently and entitled "Dynamic Determination Of Item Returns During Transit," which is also hereby incorporated by reference in its entirety.

In addition, in some embodiments the effect or influence of factors on item return handling can be dynamically configured by administrative users (e.g., representatives of a merchant for which the dynamic item return handling processing is being performed), such as users that are authorized to make such changes. For example, in some embodiments administrative users can dynamically configure the weights associated with various factors or otherwise specify how those factors will influence a dynamic item return handling determination, including by indicating that certain factors have no weight or influence. Such configurations by administrative users may in some embodiments be made on a temporary basis, or more generally may have conditions specified by the administrative users to indicate when they will apply (e.g., times at which the configurations will be effective, types of items or customers for which the configurations will be effective, etc.). Such configurability allows administrative users to rapidly adapt the response of the dynamic processing to changing conditions and situations, such as to temporarily divert items being returned to or away from a specified return location.

In addition, information about current values for factors can be determined in a variety of ways in various embodiments. For example, with respect to factors related to conditions at return locations, such conditions may be electronically accessible based on predefined relationships (e.g., based on their belonging to or being affiliated with a single organization, such as a merchant, or instead having a predefined relationship with that organization). Current information about customers and items can also be obtained in a variety of ways, including by accessing information from the merchant related to items and customers, by obtaining information from the customers related to the items and themselves (e.g., current status and condition of items, current location of items and/or customers, etc.), and by accessing various third-party information sources that can provide a variety of types of information about customers and/or items (e.g., credit reports and demographic information for customers, detailed product information about item and their attributes, etc.). Similarly, with respect to factors related to transporting items to return locations, the system may be able to dynamically obtain relevant information in various ways, such as by accessing various third-party information sources (e.g., transportation carriers to determine typical transportation times and costs, traffic and weather reports to obtain information on current traffic or weather conditions, etc.).

As previously noted, in some embodiments information is received from customers via an interactive mechanism, such as a Web site or instant messaging. In such embodiments, that interactive mechanism or other means (e.g., email) may further be used to provide information to a customer regarding how to perform the item return, such as by providing information to the customer on how and where to ship an item being returned (e.g., by displaying a shipping label on a Web page that the customer can print and use for the item return). In this manner, the system may greatly simplify the customer's involvement in the return process, thus leading to enhanced customer satisfaction. In addition, the information provided to the customer may further include information to be used by the merchant or other entity performing the return processing (e.g., an RMA number and/or information about the reasons for an item return), such as by including the information on the shipping label or with other information to be included with the item return.

In addition to dynamically determining an appropriate return location for an item return and/or appropriate routing for the item return, a variety of other types of processing related to item returns may be provided in some embodiments. For example, in some embodiments the system may further facilitate providing refunds and/or replacements to customers, whether immediately (e.g., for customers that are of sufficiently high value or are sufficiently trustworthy) or after the item return is received at the return location and/or verified. In particular, in some embodiments some or all of the factors previously discussed may be considered at the time that a customer indicates that an item is to be returned in order to determine whether to immediately promise and/or provide compensation (e.g., a refund, credit, substitution, etc.), such as based at least in part on a value of or other status of the customer—in this manner, compensation may be provided to the customer immediately or substantially immediately, and when the customer is using a Web site or other interactive mechanism to provide information about the item return, information about any such compensation may also be provided immediately or substantially immediately to the customer via that mechanism (e.g., to allow the customer to immediately purchase another item using a refund or credit). More generally, in some embodiments the dynamic orchestration by the system of the return of an item may include not only selecting a return location and assisting the customer in sending the item, but by further performing other related activities to facilitate the return processing. A variety of other types of return processing can similarly be provided, such as by offering alternative items for items being returned, by offering insurance or other protection related to return processing or for a new or replacement item to be received by the customer, by offering expedited return processing or other services for a fee, by offering to assist the user in selling unwanted items to other customers rather than returning them, etc.

In addition, in some embodiments the handling of an item return may occur in manners other than shipping an item to a specified return location. For example, in some embodiments a return of an item may involve a customer destroying and/or otherwise disposing of the item in an appropriate manner (e.g., for downloaded software or media items, or for hazardous materials that cannot be returned), and may optionally further involve the customer or a third party providing an assertion or evidence of the disposal actions (e.g., by sending a fax to a specified fax number that includes a signed statement by the customer describing the actions taken). In other situations, an item return may include merely providing contact information (e.g., a phone number) and related instructions to the customer for an intended recipient of the item (e.g., a partner of the merchant that provided the item to the customer, a charity or other related organization, etc.), with the customer then being responsible for using the contact information in an appropriate manner to cause the item to be provided to the intended recipient. A variety of other actions may be taken as part of an item return.

Furthermore, while the system will in some embodiments provide the dynamic item return handling processing for a single organization (e.g., a merchant), such as when executed by that organization, in other embodiments the system may simultaneously provide dynamic processing for a variety of organizations, such as via a fee-based service (e.g., a Web service) provided to those organizations by a third party.

For illustrative purposes, some embodiments are described below in which particular techniques are described for selecting specific types of return locations and/or specific types of return routing in specific types of ways for items being returned. However, those skilled in the art will appreciate that the techniques of the invention can be used in a wide variety of other situations, including with non-Web item ordering services, for types of items other than those explicitly discussed, and for types of item handling other than return processing.

As an illustrative example of techniques for obtaining information about items to be returned, FIGS. 1A-1F provide examples of user interface screens that may be provided to users of a Web-based item ordering service in order to assist in dynamically determining appropriate handling of item returns based at least in part on current conditions. In particular, FIG. 1A illustrates an example user interface screen 100a that an example merchant Web Merchant MMM provides to customers to facilitate returns of items previously provided to the customers by the merchant, such as via a Web page sent to the customers from a Web server of the merchant. In this example, Customer CCC has selected a Returns Center portion of the Web site of Web Merchant MMM, as indicated by current status information 105a, and is in the process of selecting one or more items to be returned.

In this example, information about a prior order 1245 by Customer CCC is shown, as indicated by order information 120, such as based on a prior selection by Customer CCC of that order (not shown) or based on that order being the only prior order that is relevant for the customer (e.g., by having been placed or fulfilled within a prior amount of time for which returns are still allowed, or being the only prior order from the customer)—in other situations, information about multiple orders may instead be displayed simultaneously. In this example, a single copy of each of two items was provided to Customer CCC as part of order 1245, those being items A and B, as shown in item information sections 125 and 130, respectively. The information for each item includes an indication of the item, such as indication 125a for item A, an indication of the quantity of the item to return, such as quantity indication 125b for item A, and an indication of a reason for the item return, such as return indication 125c for item A.

In this example, Customer CCC can indicate a desire to return an item by changing the quantity to return from the default of 0 to being 1 or more of the copies of the item that were ordered, although in other embodiments an indication of a desire to return an item can be made in other ways. In this example, Customer CCC indicates an intention to return his/her copy of item B, and then proceeds to indicate a reason for the return. In particular, in this example the dropdown list 127 indicates various reasons that the customer may supply for an item return, and Customer CCC selects reason 127a in this example to indicate that he/she had ordered the wrong item. In addition to the reasons in the dropdown list, other reasons for the return are indicated in section 110a, in which the customer can indicate that an item was received that was sent to them by mistake, whether instead of or in addition to other items that they received. After Customer CCC indicates the reason 127a, the customer selects the control 135a to continue with the return interaction.

FIG. 1B illustrates an example user interface screen 100b that is displayed to Customer CCC after selection of the "Continue" control 135a in FIG. 1A. As shown in current status information 105b, Customer CCC is now prompted in this example to select the shipping method to be used for the item return, although in other embodiments the customer may not be allowed to select the shipping method. In particular, various shipping options 145 are shown for the item(s) 140 being returned, which in this example include having Customer CCC drop off a package containing item B with the United States Postal Service or the private company UPS at no charge, or opting to pay an additional fee for item pickup. While not illustrated in this example, in other embodiments a customer may further be allowed to specify a variety of other aspects of the item return routing, such as a shipping speed and/or shipping method for a selected shipping carrier.

After Customer CCC selects the default shipping option of using the United States Postal Service in FIG. 1B and indicates to continue, a user interface screen 100c is displayed to Customer CCC in FIG. 1C that includes a shipping label 150 to be used for the return. FIG. 1C also includes instructions 151 indicating to print the screen and then cut out the shipping label, and various additional instructions 167 related to the item return process are also illustrated to Customer CCC in user interface screen 100d of FIG. 1D, whether as part of a single display to Customer CCC along with screen 100c or instead in subsequent displays. The additional instructions indicate to affix the shipping label externally to the package containing the item B, and FIG. 1D further provides summary information 165 regarding the item return, such as to display an RMA number that has been assigned to this item return by the merchant. While not illustrated here, in some embodiments the provided shipping label could further be automatically customized for the customer, such as to include the customer's name and shipping location in the "From:" section of the label.

In this example, Web Merchant MMM is employing a specialized merchandise return service of the United States Postal Service for use in this return, with the shipping costs to be billed to the merchant—in other embodiments, the customer may need to pay the shipping costs themselves, and receive reimbursement from the merchant when appropriate. However, in this example, since the item return is not the result of an error on the part of the merchant, Customer CCC is informed in section 110c that shipping costs associated with the return are the responsibility of the customer, such as to be deducted from the refund that the customer will receive. The example shipping label includes information 150a related to the merchant, including the merchant's name 150c and a previously obtained permit number 150b corresponding to the specialized merchandise return service. The shipping label also includes a section 153 indicating the postal unit serving the dynamically selected return location for this item, with the address for the selected return location also indicated in section 150a as the shipping address.

In addition, in this example Web Merchant MMM further includes additional information 160 as part of the shipping label for its own use, as indicated at 160a. In this example, the additional information includes an alphanumeric code 160b and a bar code 160c, which can be used to encode a variety of types of information that may be of use at the return location (e.g., an RMA or other tracking number related to the item return, an encoding of information about the items being returned and/or reasons for return, an encoding of return processing instructions for use at the return location, such as types of activities to perform and/or an ultimate destination to which the item return package should be forwarded, etc.). By providing the information on the shipping label on the exterior of the package, operators at the return location can quickly obtain information related to how to handle the return processing for the item return package, such as by scanning the bar code.

Thus, after Customer CCC packs item B in a package to be returned, affixes the shipping label, and provides the package to the appropriate shipping service, the item return will be processed in a manner that was dynamically determined by Web Merchant MMM after receiving the information specified by Customer CCC in FIG. 1A.

FIGS. 1E and 1F illustrate alternative examples of shipping labels and instructions that may be used as part of the item return process. In particular, FIG. 1E illustrates an example user interface screen 100e that may be provided to some customers in place of user interface screen 100c illustrated in FIG. 1C. While FIG. 1E includes a shipping label 150 similar to that shown in FIG. 1C, information 110e indicates to the customer that shipping costs associated with the item will be refunded to the customer in this example, such as for an item return that resulted from an error on the part of the merchant, but that is to be performed in a manner that requires the customer to initially incur some costs (e.g., such as to the shipping service).

FIG. 1F illustrates yet another alternative user interface screen 100f that may be provided to customers in place of user interface screen 100c in FIG. 1C. In this example, information for use by the merchant that was previously incorporated in shipping label 150 in FIG. 1C is instead separated into two distinct labels 170 and 175. In particular, as indicated in instructions 171, label 170 is to be affixed externally to the item return package to provide shipping information, including information about the merchant and return location in a manner similar to shipping label 150 but not illustrated here for the sake of brevity. In addition to the external shipping label 170, FIG. 1F further illustrates an example of additional information to be provided by Customer CCC inside the item return package that is for use at the return location, as indicated in instructions 176. In this example, the internal label 175 includes information similar to that shown in section 160 of shipping label 150 in FIG. 1C, although label 175 includes an RMA number rather than the alphanumeric code 160b of FIG. 1C, and further includes additional textual information to indicate that item B is being returned for the reason that it was mistakenly shipped to the customer. Furthermore, in this example, the external shipping label 170 is enhanced to include information 173 for use by operators at the return location, which in this example includes an indication of a shipment tracking alphanumeric code. It will be appreciated that a variety of other types of information could be encoded in external and/or internal labels in a variety of ways and can be used by the return location to provide a variety of types of functionality.

In other embodiments, a variety of other types of shipping labels could be generated, including for use with other shipping carriers or services (e.g., private shipping company United Parcel Service, or "UPS"). In addition, while not illustrated here, a merchant's Web site or other interactive mechanism could further provide a variety of other types of information and services to customers in other embodiments. For example, before receiving user interface screen 100a in FIG. 1A, a customer could initially receive a user interface screen that provides various information about prior orders by the customer, such as to allow selection of an order having an item to be returned. In addition, the customer could be queried as to whether the item being returned was ordered by the customer or instead received as a gift, and various other types of information for gift items being returned could further be gathered. Similarly, the customer could be queried in at least some circumstances as to whether they would like to receive a refund or a replacement. In addition, for at least some items being returned (e.g., those for which only a partial or no refund is available), the customer could be queried as to whether they would like to list the item for sale to other customers. For situations in which a customer has mistakenly received an item, the customer could be queried as to whether they would like to keep the item, such as at a discount (e.g., a discount based on the cost to the merchant of performing return processing for the item if it is returned). Also, when providing a shipping label and/or other information related to performing the item return, such information could instead be provided to the customer in other ways, such as via fax or email. Finally, after a customer has initiated one or more item returns, information related to the returns can be provided to customers in various ways, such as to indicate the status of returns and the cumulative amount of refunds received as part of summary information provided to the customer that is related to the customer's prior activities.

Figure 2:
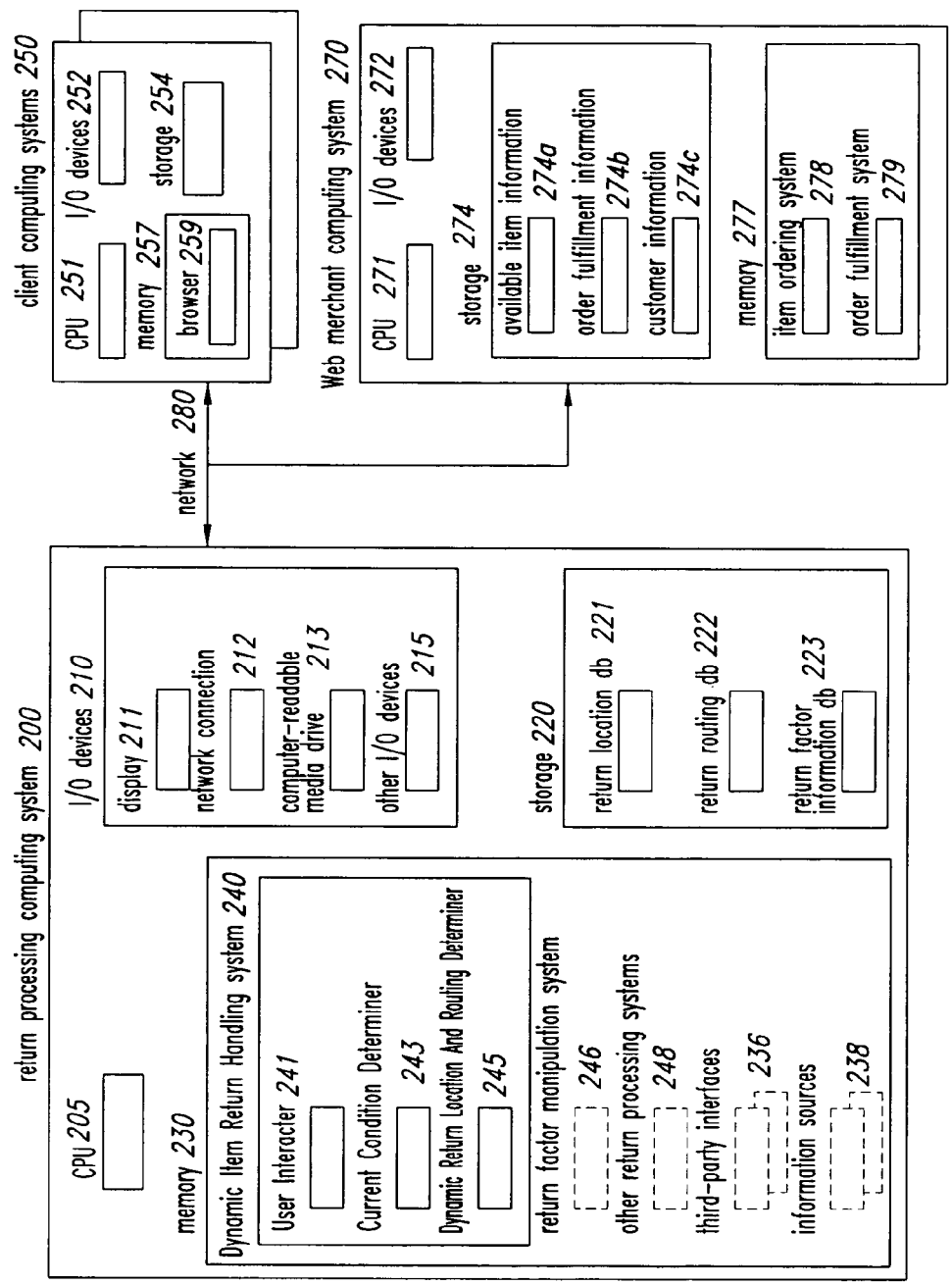
FIG. 2 is a block diagram illustrating an embodiment of a system for dynamically determining appropriate handling of item returns based at least in part on current conditions.

FIG. 2 illustrates a return processing computing system 200 that is suitable for executing an embodiment of a system for performing dynamic item return handling processing, as well as one or more client computing systems 250 with which users can interact with the system and a Web merchant computing system 270 with which the system 200 can programmatically interact. In this example embodiment, the Web merchant computing system performs order processing activities for the merchant, and the return processing system 200 performs activities on behalf of the merchant to facilitate return processing.

In the example embodiment, the computing system 200 includes a CPU 205, various input/output ("I/O") devices 210, storage 220, and memory 230. The I/O devices include a display 211, a network connection 212, a computer-readable media drive 213, and other I/O devices 215. An embodiment of a Dynamic Item Return Handling ("DIRH") system 240 is executing in memory 230, and in this example embodiment it includes a User Interacter component 241, a Current Condition Determiner component 243, and a Dynamic Return Location and Routing Determiner component 245. The DIRH system receives information about items to be returned and dynamically determines an appropriate return location and/or return routing for the return. In other embodiments, the DIRH system could further dynamically determine a variety of additional types of return processing activities to be performed for items being returned.

The dynamic return handling functionality of the DIRH system is initiated when it receives an indication that one or more items are to be returned, such as indications received from customers at client computing systems. In such situations, the User Interacter component interacts with the customers to obtain information about the item returns, such as by providing Web pages to a browser 259 executing in memory 257 of the client computing system being used by the customer. In some embodiments the component may gather and use various information when interacting with the customers, such as by interacting with the Web merchant computing system to access stored information including available item information 274a, order fulfillment information 274b and customer information 274c stored on storage 274.

After the item-related information is obtained from the customer, the DIRH system then identifies potential return locations for the return and/or potential return routing options for the return, such as by obtaining information from a return location database 221 and return routing database 222 on storage 220, although in other embodiments the DIRH system could obtain at least some such information from the Web merchant computing system. The DIRH system further obtains information about relevant factors that may influence the choice of which return location and/or return routing option to dynamically select, such as based on return factor information in database 223 of storage 220.

The Current Condition Determiner component then obtains information about current values for various factors with respect to the various return locations and return routing options, such as based on current conditions relevant to those factors. Such current condition information can be obtained in a variety of ways, such as by accessing optional information sources 238 executing in memory 230 or elsewhere and/or by using optional third-party interfaces 236 to obtain information from other remote systems (e.g., to obtain information about distribution centers of the merchant from the Web merchant computing system, or to obtain information about shipping options from computing systems for third-party shippers).

After current factor information is available for the various return location options, the Dynamic Return Location and Routing Determiner component evaluates the return locations and return routing options with respect to the factors, such as by using current weight information for the factors from the return factor information database in order to generate weighted scores. The component then selects one or more of the return location options and/or return routing options with the highest evaluations for use as part of the item return processing. The User Interacter component may then provide information to the customer regarding the determined return location(s) and/or return routing option(s), such as by displaying a mailing label for use in sending an item to a single automatically selected return location using a single automatically selected type of return routing, or instead by providing information to the customer to allow them to select between multiple return location and/or return routing options (e.g., for a fee).

In addition, in the illustrated embodiment an optional return factor manipulation system 248 is also executing in memory 230, such as to allow administrative users to dynamically configure how various factors influence the evaluation process during the dynamic item return handling processing. For example, administrative users representing the Web merchant can access the manipulation system 248 from a client computing system 250 or other computing system in order to modify weights assigned to factors and/or otherwise manipulate which factors are relevant for corresponding return locations, return routing options and/or other types of return processing.

In this example embodiment, one or more other return processing systems 232 may also optionally be executing in memory 230, such as to facilitate item return processing in coordination with the DIRH system. For example, such other return processing systems may notify return locations of item return packages to be expected and of associated processing to be performed for those packages, and may further perform refund processing on behalf of customers after item returns are processed.

In other embodiments, the DIRH system and other return-related systems may be integrated with the ordering and/or fulfillment systems of a single merchant (e.g., item ordering system 278 and order fulfillment system 279 executing in memory 277 of the Web merchant computing system), such as to support only the operations of that merchant, or alternatively the DIRH system and other return-related systems may instead provide return processing functionality for multiple distinct merchants, such as part of a fee-based service (e.g., by providing a programmatic API to those merchants, such as based on Web services).

Those skilled in the art will appreciate that computing systems 200, 250 and 270 are merely illustrative and are not intended to limit the scope of the present invention. Computing system 200 may be connected to other devices that are not illustrated, including through one or more networks such as the Internet or via the World Wide Web ("Web"). More generally, a "client" or "server" computing system or device may comprise any combination of hardware or software that can interact, including desktop or other computers, network devices, PDAs, cellphones, cordless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated DIRH system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the DIRH system components or data structures may also be stored (e.g., as software instructions or structured data) on a computer-readable medium, such as a hard disk, a memory, a network, or a portable media article to be read by an appropriate drive or via an appropriate connection. The DIRH system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
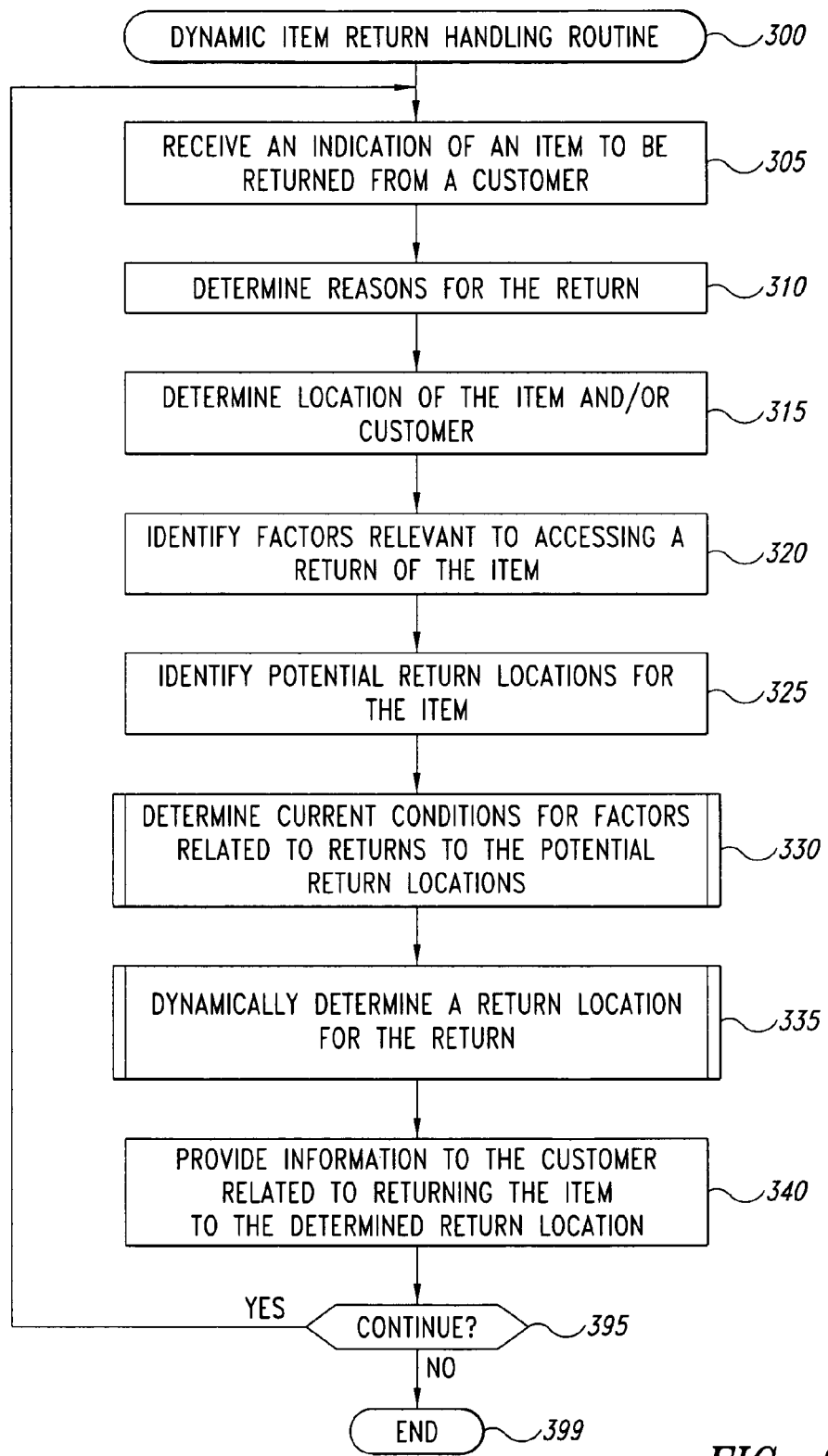
FIG. 3 is a flow diagram of an embodiment of a Dynamic Item Return Handling routine.

FIG. 3 is a flow diagram of an embodiment of a Dynamic Item Return Handling routine 300. The routine may, for example, be provided by execution of an embodiment of the DIRH system 240 and/or User Interacter component 241 of FIG. 2. In this illustrated embodiment, the routine receives indications of items to be returned, and dynamically determines how to handle the returns of those items, such as by dynamically selecting a return location to which those items are to be returned. While not illustrated in this embodiment, in other embodiments the routine may dynamically select a type of return routing to be used as part of the item return, whether instead of or in addition to dynamically selecting a return location.

The routine begins in step 305, where an indication is received of an item to be returned from a customer, such as an indication received from the customer (e.g., after the customer has received the item, or alternatively after the customer has ordered the item but not yet received it). The routine continues to step 310 to determine reasons for the return and in step 315 to determine a current location of the item, such as via interactions with the customer and/or based on information received in step 305. In step 320, various factors are then identified that are relevant to assessing appropriate return processing for the item, and in step 325 the routine identifies potential return locations for the item, such as by retrieving stored indications of the factors and return locations. The routine then continues to execute subroutine 330 to determine current conditions for at least some of the factors related to the potential return locations. The routine then continues to execute subroutine 335 to dynamically determine an appropriate return location for the item based on the factors and current conditions, and continues to step 340 to provide information to the customer that is related to returning the item to the determined return location (e.g., a shipping label). While not illustrated here, in some embodiments the routine may further provide information about multiple return location options and/or return routing options to the customer and allow the customer to specify how the item return handling is to occur.

After step 340 the routine continues to 395 to determine whether to continue. If so, the routine returns to step 305, and if not continues to step 399 and ends. While not illustrated here, a variety of other types of item return processing could similarly be dynamically and automatically determined, including specific types of handling for an item return (e.g., to verify authenticity of the item), and to provide refunds or replacements to customers as appropriate.

Figure 6:
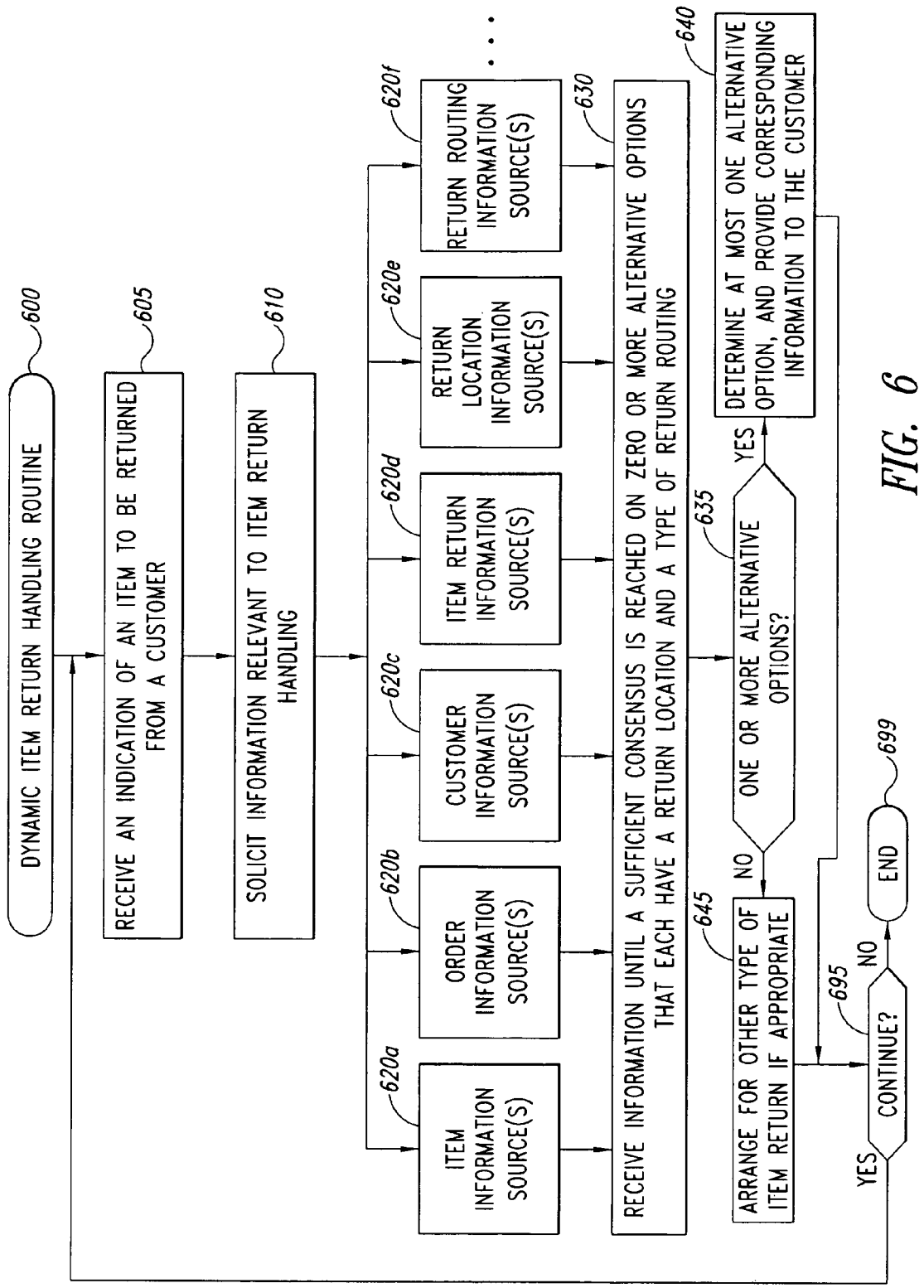
FIG. 6 is a flow diagram of an alternative embodiment of the Dynamic Item Return Handling routine.

In addition, while the embodiment illustrated in FIG. 3 illustrates a specific example series of steps that are performed, in other embodiments some or all of the illustrated actions may instead be performed in other orders and/or in other ways. For example, as discussed in greater detail below, FIG. 6 illustrates an alternative embodiment of the Dynamic Item Return Handling routine in which the item return handling processing is performed in an alternative manner.

Figure 4:
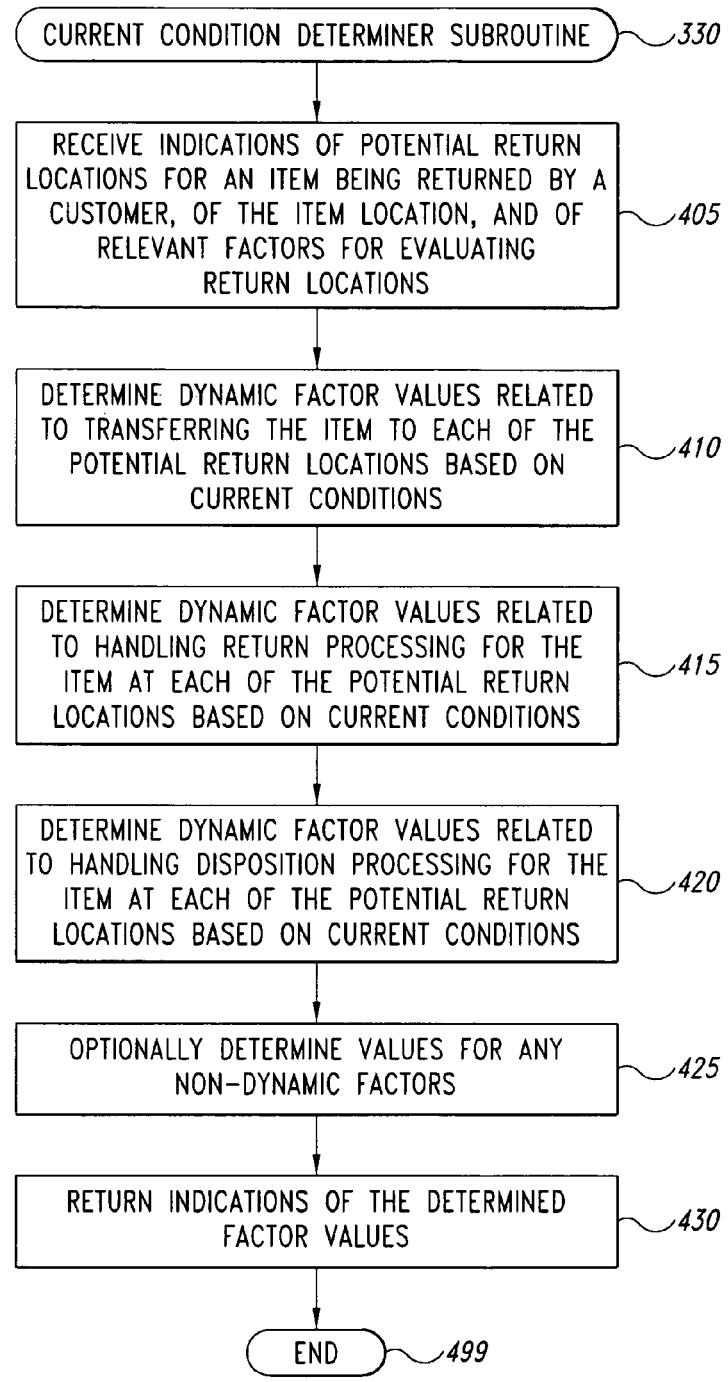
FIG. 4 is a flow diagram of an embodiment of a Current Condition Determiner subroutine.

FIG. 4 illustrates an embodiment of a Current Condition Determiner subroutine 330. The subroutine may, for example, be provided by execution of an embodiment of the Current Condition Determiner component 243 of FIG. 2. In this illustrated embodiment, the subroutine receives information about potential return locations for an item return and various factors relevant to the item return, and determines values for the factors for the return locations based at least in part on current conditions.

The subroutine begins in step 405, where indications are received of potential return locations for an item being returned from a customer, of the location of the item, and of various factors relevant to evaluation of the potential return locations. While not illustrated here, in other embodiments the information to be evaluated could more generally be various plans that include not only return locations but additional information related to return routing options and/or other information about how items are to be transferred to their return locations, specific types of processing to be performed at the return locations, and/or additional disposition activities after the return processing is completed. In addition, in some embodiments additional types of information could be received and used when determining information about current conditions, including information about the customer who is returning the item.

The subroutine next continues to step 410 to determine values based on current conditions for dynamic factors that are related to transferring the item to each of the potential return locations, such as factors relevant to cost and time in transporting the items (e.g., weather conditions, traffic conditions, shipping service conditions, etc.)—in some embodiments, various return routing options may more generally be considered. In step 415, the subroutine then determines values based on current conditions for dynamic factors that are related to performing return processing for the item at each of the potential return locations, such as based on capabilities and current item handling capacities (e.g., storage and labor) at the return locations. In step 420, the subroutine then determines values based on current conditions for dynamic factors that are related to handling disposition processing for the item at each of the potential return locations after the return processing is completed, such as based on capabilities and capacities at the return location for performing the final disposition, as well as any need or desire for the item (e.g., to supplement low inventory levels or low work load levels). The disposition processing after the return processing may include, for example, sending the item to another destination (e.g., to send the item to another customer to fulfill a current order from that other customer for the item).

If there are any non-dynamic factors whose values vary rarely if at all, and thus are not typically based on current conditions, the subroutine obtains information about values for those factors in step 425, such as by retrieving the corresponding information from databases or other information sources. The system then continues in step 430 to return indications of the determined values for the factors, and ends in step 499. As discussed elsewhere, information about current conditions can be obtained and assessed in a variety of ways, including by obtaining information from a merchant on whose behalf the return processing is being performed and/or obtaining information from other relevant third-party information sources.

Figure 5:
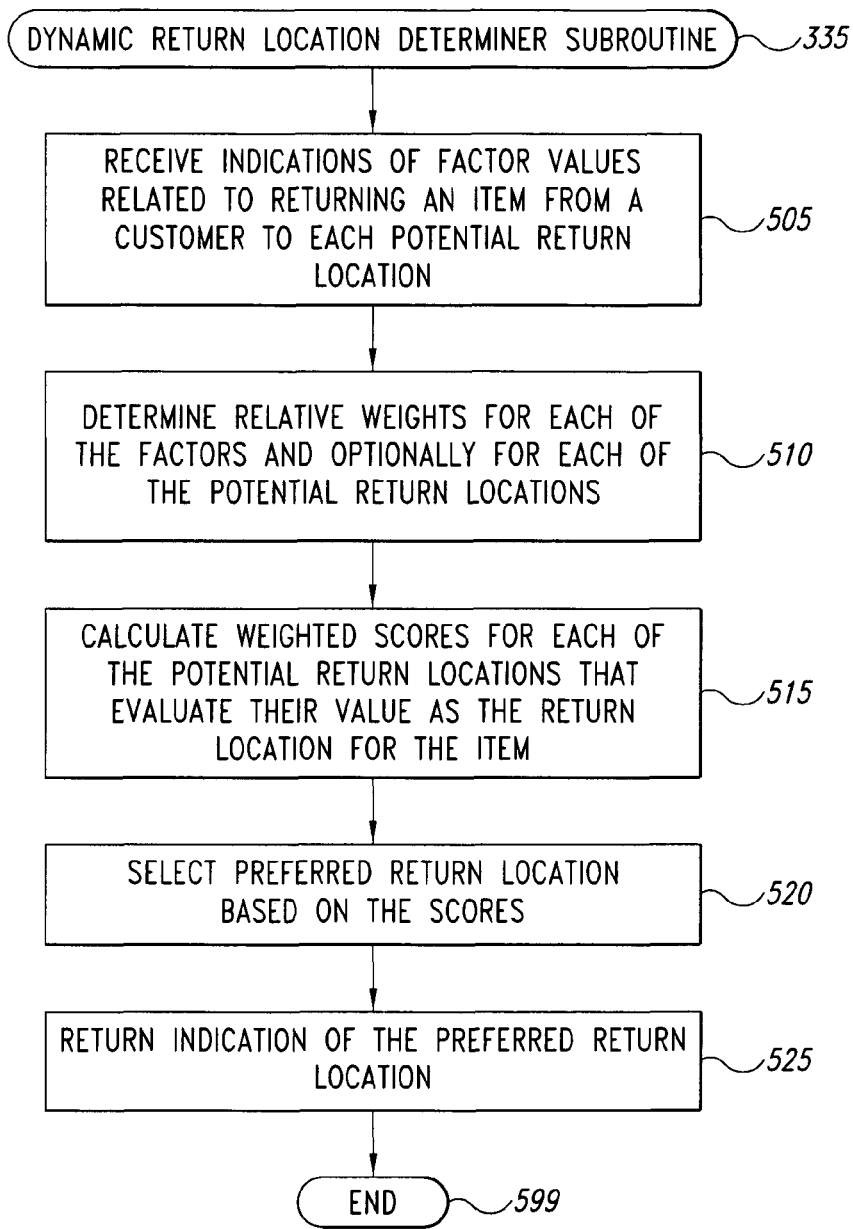
FIG. 5 is a flow diagram of an embodiment of a Dynamic Return Location Determiner subroutine.

FIG. 5 illustrates an embodiment of a Dynamic Return Location Determiner subroutine 335. The subroutine may, for example, be provided by execution of an embodiment of the Dynamic Return Location and Routing Determiner component 245 of FIG. 2. In this illustrated embodiment, the subroutine receives information about return location options for an item return and values for various factors relevant to evaluating the return locations, and dynamically determines the return location with the highest evaluation based on the factor values.

The subroutine begins at step 505, where indications are received of factor values based at least in part on current conditions that are related to returning an item from a customer to each of multiple possible return locations. In step 510, the subroutine then determines relative weights for each of the factors to be used in assessing their relevance during the evaluation, as well as optionally receiving weighting information specific to one or more of the return locations (e.g., to express a preference for one or more of the return locations independent of the other factors)—by retrieving the weight information dynamically, any user-modifications or configurations of the weight information for the factors can be rapidly incorporated into the evaluation process. The subroutine then continues at step 520 to calculate weighted scores for each of the possible return locations to represent the value to the merchant on whose behalf the return processing is being performed of using that return location for the item return, and in step 525 selects the preferred return location based on the calculated scores (e.g., the return location with the highest evaluation). In step 530, the subroutine returns an indication of the selected preferred return location, and in step 599 ends. While not illustrated here, in some embodiments the subroutine may rank multiple return locations relative to each other and provide information about multiple return locations and their relative rankings, such as to allow preference information (e.g., that of the merchant and/or the customer) to be manually or automatically obtained and used in selecting the return location.

FIG. 6 is a flow diagram of an alternative embodiment of the Dynamic Item Return Handling routine. The routine may, for example, be provided by execution of an embodiment of the DIRH system 240 and/or User Interacter component 241 of FIG. 2. In this illustrated embodiment, the routine 600 receives indications of items to be returned, and dynamically determines how to handle the returns of those items, such as by dynamically selecting a return location to which those items are to be returned and dynamically selecting a type of return routing to be used as part of the item return. In contrast to the embodiment of the Dynamic Item Return Handling routine illustrated in FIG. 3, the embodiment illustrated in FIG. 6 attempts to obtain in parallel various types of information related to item return handling, and proceeds with the item return handling processing as soon as sufficient information is received to make a determination regarding how the item return handling is to be performed.

The routine begins in step 605, where an indication is received of an item to be returned from a customer, such as an indication received from the customer. The routine continues to step 610 to solicit information relevant to the item return handling decision, such as information related to some or all of the previously discussed factors that may be considered during a dynamic item return handling determination. In particular, in the illustrated embodiment the routine attempts to obtain information in parallel from a variety of a types of information sources 620, including one or more sources of information 620a about the item being returned, one or more sources of information 620b about the order for which the item was previously provided to the customer, one or more sources of information 620c about the customer, one or more sources of information 620d about the current item return, one or more sources of information 620e about potential return locations for the item return, and one or more sources of information 620f about potential types of item return routing, as well as optionally one or more sources of other types of information (not shown).

As examples, the item, order and customer information sources may include one or more systems of a merchant that originally provided the item to the customer as part of an order. Examples of item return information sources may include one or more mechanisms by which information is received from a customer regarding an item return, including via a Web site, phone, email, instant messaging, fax, etc. In addition, examples of return location information sources and/or return routing type information sources include one or more systems of a merchant that originally provided the item to the customer as part of an order (e.g., to determine return locations associated with the merchant) and/or one or more systems of shipping carriers (e.g., to determine types of return routing that are available). Moreover, the obtaining of information from the information sources can be performed in various ways in various embodiments, including by retrieving stored information from an appropriate data store, requesting another component or system (whether local or remote) with access to the information to send it (e.g., by invoking a Web service or other API mechanism of the component or system), interacting with one or more users (e.g., the customer), etc.

In addition, as previously noted, the information received from the various information sources can include a variety of types of factors related to the dynamic item return handling determination, with the types of factors varying in different embodiments. In addition, each information source may be able to provide information for one or more of the types of factors, and may provide different types of information for different types of items and/or at different times. Examples of types of factors for which information may be received and used in some embodiments include a reason for the item return, a location of the item and/or customer, various attributes of the item (e.g., the weight, value, product line, whether it is hazardous or has other restrictions related to its transportation, etc.), various information about the customer (e.g., a value or other status of the customer to the merchant; a level of reliability or trust in the customer, such as based on past interactions with the customer; etc.), various information about the order (e.g., any discounts or rebates given to the customer based on the item being returned), information about potential return locations (e.g., indications of demand for the item and capacity to handle the item return at an item distribution return location), information about potential types of item return routing (e.g., available shipping carriers; available types of shipping speed; available shipping modes; available shipping paths; and various types of shipping methods, such as that affect shipment tracking, delivery verification, payment collection, insurance coverage, and specialized types of handling), etc.

As information is obtained from the various information sources 620, the information is received in step 630 and dynamically evaluated. In the illustrated embodiment, once a sufficient amount of information is received to determine how the item return may be handled, the routine continues to step 635 without requiring that all types of information have been received, although in other embodiments such evaluation processing may be performed in other manners. For example, if information is obtained in the illustrated embodiment that indicates that an item return is sufficiently likely to be fraudulent, the routine may determine one or more alternatives for handling the item return on that basis. Such a determination of a likelihood of fraudulence may be made in various ways, including solely based on information about the customer, solely based on information about the prior order, solely based on information about the item, or based on a combination of information of various types.

The evaluation of the various types of information and the determination of when sufficient information has been received may also be performed in various ways in various embodiments. For example, in some embodiments one or more factors may be sufficiently important that they are required for the evaluation. Alternatively, in some embodiments each factor may be weighted (whether in a static manner or based on weighting information that is dynamically retrieved for each item return), and a threshold may be selected such that a sufficient cumulative weighted value for the received factor information will be used to determine that sufficient information has been received. A variety of other types of logic could be used to perform the evaluation in various embodiments, and various types of techniques for combining and/or evaluating information may be used (e.g., probabilistic reasoning, neural networks, fuzzy logic, decision trees, etc.).

In step 635, the routine receives an indication from the evaluation process in step 630 of zero or more alternatives that have selected for the item return handling, with each of the alternatives in the illustrated embodiment including an indication of a return location and one or more types of return routing. The routine determines in step 635 whether at least one alternative was received, and if not continues to step 645 to attempt to arrange for some other type of item return. For example, if having the item transported to a return location is undesirable, one of a variety of other types of alternatives for the item return may instead be selected (e.g., discarding or destroying the item; instructing that the item be provided to a third party, such as a charity; etc.). If another item return alternative is determined, the routine provides corresponding information to the customer in step 645 to facilitate handling of that item return, and otherwise may provide information to the customer that no item return is to be performed (e.g., if a value of a returned item is less than the cost of having the item return be performed, the routine may instruct the customer to retain the item).

If it was instead determined in step 635 that at least one alternative having a return location and return routing was received, the routine continues to step 640 to determine at most one of those alternatives to be used for the item return. For example, if only one alternative was received, the routine may in some embodiments and situations automatically determine that the one alternative be used, while in other embodiments and situations the determination may be performed in other manners (e.g., by querying the customer whether that one alternative should be used). Similarly, if multiple alternatives are received, a determination of zero or one of the alternatives can be performed in various manners, such as by querying the customer for a selection and/or preference information, automatically evaluating the alternatives in various ways, etc. If an item return alternative is determined, the routine provides corresponding information to the customer to facilitate that item return processing, and otherwise may provide information to the customer that no item return is to be performed.

After steps 640 or 645, the routine continues to step 695 to determine whether to continue. If so, the routine returns to step 605, and if not continues to step 699 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for dynamically determining a location to which an item of merchandise is to be returned, the method comprising:

receiving at a first time an indication that an item previously sent to a customer by a merchant is to be returned;

at a later second time after the receiving of the indication, automatically determining current conditions and one or more projected future conditions at each of multiple possible return locations for a return of the item, the one or more projected future conditions at the return locations including projected future labor capacity at the return locations to perform processing of item returns, the automatic determining of the current conditions and the projected future conditions being performed by a configured computing system of the merchant and including, for each of the multiple possible return locations, performing electronic interactions with one or more other computing systems at that possible return location to obtain information about the current conditions at that possible return location; and dynamically selecting at the second time one of the multiple possible return locations for the item based at least in part on the determined current conditions and the determined projected future conditions at the multiple possible return locations, the dynamic selecting being automatically performed by the configured computing system; and providing information regarding the dynamically selected return location to enable the item to be sent to that return location.

2. The method of claim 1 wherein the information regarding the dynamically selected return location is provided to the customer so as to enable the customer to ship the item to that return location.

3. The method of claim 2 wherein the information provided to the customer includes a dynamically generated shipping label that is addressed to the dynamically selected return location and is for use in shipping the item to that return location.

4. The method of claim 1 further including, after the receiving of the indication, dynamically determining one or more types of routing for use in sending the item to a return location, and facilitating the use of the one or more determined routing types for the sending of the item.

5. The method of claim 4 wherein the determining of the one or more types of routing is performed after the dynamic selecting of the one return location, and wherein the one or more determined types of routing are based at least in part on the selected return location.

6. The method of claim 4 wherein the determining of the one or more types of routing includes identifying one or more types of routing for each of the multiple possible return locations, and wherein the dynamic selecting of the one return location is performed so as to select a combination of the one return location and the one or identified types of routing for that one return location.

7. The method of claim 4 wherein the facilitating of the use of the one or more determined routing types for the sending of the item includes providing information to the customer regarding the one or more determined routing types so that the customer can send the item in such a manner as to use those routing types.

8. The method of claim 4 wherein the facilitating of the use of the one or more determined routing types for the sending of the item includes providing information regarding the one or more determined routing types in such a manner that a shipping carrier via which the item will be sent to the selected return location will use those routing types.

9. The method of claim 4 wherein the one or more determined types of routing include one or more of a shipping carrier via which the item will be sent to a return location, a transportation speed with which the item will be sent to a return location, a transportation mode via which the item will be sent to a return location, a transportation path via which the item will be sent to a return location, and one or more shipping methods for use in sending the item to a return location.

10. The method of claim 4 wherein the determining of the one or more types of routing is based at least in part on the current conditions related to sending the item to one or more of the multiple possible return locations.

11. The method of claim 4 wherein the determining of the one or more types of routing includes selecting from multiple possible types of routing.

12. The method of claim 1 wherein the dynamic selecting of the one return location for the item is further based at least in part on multiple factors whose values are based on current conditions and on weightings assigned to the factors that indicate a relative influence of the factors on the dynamic selecting.

13. The method of claim 1 wherein the current conditions at each of the return locations reflect an ability of and/or need for that return location to perform return processing for the item.

14. The method of claim 13 wherein the current conditions at each of the return locations further reflect an ability of and/or need for that return location to perform disposition processing for the item after the return processing is performed.

15. The method of claim 1 further comprising determining, by the configured computing system, current conditions at the second time related to sending the item to each of the multiple possible return locations, wherein the current conditions related to sending the item to each of the return locations reflect a cost and/or an amount of time to send the item to that return location, and wherein the dynamic selecting of the one return location for the item is further based in part on the determined current conditions related to sending the item to the return locations.

16. The method of claim 1 wherein the dynamic selecting of the one return location for the item is further based at least in part on current conditions related to the item and/or to the customer.

17. The method of claim 1 wherein the dynamic selecting of the one return location for the item is further based at least in part on an indication that the item has been recalled.

18. The method of claim 1 wherein the dynamic selecting of the one return location for the item is further based at least in part on a determined possibility that the return of the item involves fraud.

19. The method of claim 18 wherein the selected return location is associated with a law enforcement agency who may prosecute the fraud.

20. The method of claim 18 wherein the selected return location is associated with an investigative agency to investigate the fraud.

21. The method of claim 1 wherein the dynamic selecting of the one return location for the item is further based at least in part on a type of the item.

22. The method of claim 1 wherein the dynamic selecting of the one return location for the item is further based at least in part on information about past activities of the customer.

23. The method of claim 1 wherein the dynamic selecting of the one return location for the item is further based at least in part on a determined value of the customer to a merchant who previously sent the item to the customer.

24. The method of claim 1 wherein the dynamic selecting of the one return location for the item is further based at least in part on a selection by the customer related to the one return location that is made after the receiving of the indication.

25. The method of claim 1 wherein the indication that the item is to be returned further includes an indication of one or more reasons for the return of the item, and wherein the dynamic selecting of the one return location is further based at least in part on one or more of the indicated reasons.

26. The method of claim 25 wherein the projected future conditions at each of the return locations include a level of ability of that return location to perform return processing at a future time.

27. The method of claim 26 wherein the projected future conditions at each of the return locations further reflect a level of ability of that return location to perform disposition processing at the future time after the return processing is performed.

28. The method of claim 26 wherein the determined current conditions at each of the multiple possible return locations includes current labor capacity at the possible return location, and wherein the level of ability of a return location to perform return processing is based on the current labor capacity at the return location, the projected future labor capacity at the return location, current storage capacity at the return location, and projected future storage capacity at the return location.

29. The method of claim 25 wherein the current conditions at the multiple possible return locations is based on an indicated current desire of at least one of the multiple possible return locations to perform return processing.

30. The method of claim 29 wherein the current desire for the at least one return location to perform return processing is based on at least one of excess capacity at the at least one return location for performing return processing and a received indication to provide the item to another customer from the at least one return location.

31. The method of claim 25 wherein the current conditions at the multiple possible return locations is based on an indicated current need of at least one of the multiple possible return locations to perform return processing.

32. The method of claim 31 wherein the current need for the at least one return location to perform return processing is based on a lack of inventory of the item at the at least one return location relative to at least one of current and/or projected future demand for the item at the at least one return location.

33. The method of claim 25 further comprising determining, by the configured computing system, current conditions at the second time related to sending the item to each of the multiple possible return locations that reflect a current cost and a current amount of time to send the item to that return location.

34. The method of claim 25 wherein the dynamic selecting of the one return location for the item is further based at least in part on current conditions related to the item.

35. The method of claim 25 wherein the dynamic selecting of the one return location for the item is further based at least in part on current conditions related to the customer.

36. The method of claim 25 wherein the indicated reasons reflect that the item is not defective, and wherein the dynamically selected return location is an item distribution center of a merchant who previously sent the item to the customer so that the returned item can be subsequently provided to another customer.

37. The method of claim 25 wherein the indicated reasons reflect that the item is not defective, and wherein the dynamically selected return location is another customer to whom a merchant who previously sent the item to the customer is providing the item.

38. The method of claim 25 wherein the indicated reasons reflect that the item is defective, and wherein the dynamically selected return location is a repair facility and/or a location associated with a party involved in supplying the item to a merchant who subsequently sent the item to the customer.

39. The method of claim 1 wherein the dynamic selecting of the one return location for the item further includes dynamically determining one or more activities to be performed at the return location related to the item.

40. The method of claim 1 wherein the indication that the item is to be returned is received from the customer based on an interaction of the customer with a Web site of a merchant who previously sent the item to the customer, and wherein a shipping label is provided to the customer via a Web page from the Web site as part of the interaction.

41. The method of claim 1 wherein the indication that the item is to be returned is received from a party other than the customer, and wherein the information regarding the dynamically selected return location is provided to the customer so as to notify the customer that the item is to be returned.

42. The method of claim 1 wherein the information regarding the dynamically selected return location is provided to the customer, and wherein the providing of the information to the customer is performed after the receiving of the indication.

43. The method of claim 1 wherein the information regarding the dynamically selected return location is provided to the customer, and wherein the providing of the information to the customer is performed after the dynamic selecting of the one return location.

44. The method of claim 1 wherein the dynamic selecting of the one return location includes attempting to obtain from multiple sources in parallel information of multiple types related to selecting a return location, evaluating information that is obtained, and selecting the one return location based on the evaluating once the obtained information is sufficient to perform the selecting.

45. The method of claim 44 wherein the information of the multiple types that is attempted to be obtained includes information about the current conditions at each of the return locations and about current conditions related to sending the item to each of the return locations.

46. The method of claim 44 wherein the evaluating of the obtained information is performed in such a manner as to evaluate each of at least some of the multiple return locations, and wherein the selecting of the one return location based on the evaluating once the obtained information is sufficient includes repeatedly performing the evaluating until an evaluation for one of the multiple return locations reaches a specified threshold.

47. The method of claim 1 further including, after the receiving of the indication, dynamically determining whether to immediately provide a refund to the customer based at least in part on current conditions that include information about the customer.

48. The method of claim 1 further including, after the receiving of the indication, dynamically determining whether to immediately promise a refund to the customer based at least in part on current conditions that include information about the customer.

49. The method of claim 1 further including, after the dynamic selecting of the one return location for the item, receiving one or more indications from an administrative user to adjust how return locations are dynamically selected for items and implementing the indicated adjustments so that dynamic selection of return locations for subsequent items being returned will be modified based on the adjustments.

50. A non-transitory computer-readable medium whose contents configure a computing device to dynamically determine a location to which an item of merchandise is to be returned, by performing a method comprising:
receiving an indication that an item previously sent to a customer is to be returned;
after the receiving of the indication,
automatically determining current conditions and one or more projected future conditions at each of multiple possible return locations for the item, the multiple return locations being associated with a merchant that previously sent the item to the customer, the one or more projected future conditions at the return locations including projected future storage capacity at the return locations to store items being returned, the automatic determining of the current conditions and the projected future conditions being performed by the configured computing device and including performing electronic interactions with one or more computing systems of the merchant to obtain information about the current conditions at each of the multiple possible return locations; and
dynamically selecting one of the multiple possible return locations for the item based at least in part on the determined current conditions and the determined projected future conditions at each of the multiple possible return locations, the dynamic selecting being performed by the configured computing device; and
providing information regarding the dynamically selected return location to enable the item to be sent to that return location.

51. The non-transitory computer-readable medium of claim 50 wherein the indication that the item is to be returned further includes an indication of one or more reasons for the return of the item, and wherein the dynamic selecting of the one return location is further based at least in part on one or more of the indicated reasons.

52. The non-transitory computer-readable medium of claim 51 wherein the indicated reasons reflect that the item is not defective, and wherein the dynamically selected return location is an item distribution center of a merchant who previously sent the item to the customer so that the returned item can be subsequently provided to another customer.

53. A computing system configured to dynamically determine a location to which an item of merchandise is to be returned comprising:
- a processor;
- a first component that is configured to, when executed by the processor, receive at a first time an indication that an item previously sent to a customer is to be returned and to, at a later second time after the receiving of the indication:
  - automatically determine current conditions and one or more projected future conditions at each of multiple possible return locations for the item, the current conditions and the one or more projected future conditions being changing conditions that have different values at different times, the automatic determining of the current conditions and the projected future conditions including performing electronic interactions with one or more other computing systems to obtain information from one or more of the multiple possible return locations about the current conditions at the one or more possible return locations; and
  - dynamically select at the second time one of the multiple possible return locations for the item based at least in part on the determined current conditions and the determined projected future conditions at each of the multiple possible return locations; and
- a second component that is configured to, when executed by the processor, provide information regarding the dynamically selected return location to enable the item to be sent to that return location.

54. The computing system of claim 53 wherein the indication that the item is to be returned further includes an indication of one or more reasons for the return of the item, and wherein the dynamic selecting of the one return location is further based at least in part on one or more of the indicated reasons.

55. The computing system of claim 54 wherein the indicated reasons reflect that the item is not defective, and wherein the dynamically selected return location is an item distribution center of a merchant who previously sent the item to the customer so that the returned item can be subsequently provided to another customer.

\* \* \* \* \*

UNITED STATES PATENT AND TRADEMARK OFFICE
CERTIFICATE OF CORRECTION

| | | |
|---|---|---|
| PATENT NO. | : 8,156,007 B1 | Page 1 of 1 |
| APPLICATION NO. | : 10/987213 | |
| DATED | : April 10, 2012 | |
| INVENTOR(S) | : Felix Antony et al. | |

It is certified that error appears in the above-identified patent and that said Letters Patent is hereby corrected as shown below:

ON THE TITLE PAGE:

Item (75):
"Felix Anthony, Issaquah, WA (US); Donald Kaufman, Kirkland, WA (US), Weiling Yang, Sammamish, WA (US); Jeffrey D. Evarts, Seattle, WA (US)" should read, --Felix Antony, Issaquah, WA (US); Donald Kaufman, Kirkland, WA (US); Weiling Yang, Sammamish, WA (US); Jeffrey D. Evarts, Seattle, WA (US)--.

IN THE CLAIMS:

Column 25, Line 8, in Claim 32:
"return location relative to at least one of the current and/or projected" should read,
--return location relative to at least one of the current and projected--.

Signed and Sealed this
Seventh Day of August, 2012

David J. Kappos
*Director of the United States Patent and Trademark Office*